United States Patent Office 3,597,482
Patented Aug. 3, 1971

3,597,482
AMINONAPHTHYLAMIDE COMPOUNDS AND MEANS FOR THEIR PRODUCTION
Leslie M. Werber, Ann Arbor, Mich., assignor to Parke, Davis & Company, Detroit, Mich.
No Drawing. Filed Feb. 24, 1969, Ser. No. 801,846
Int. Cl. C07c 103/33
U.S. Cl. 260—562
4 Claims

ABSTRACT OF THE DISCLOSURE

Aminonaphthylamide compounds in the form of free bases (I) and acid salts are provided by hydrolyzing the corresponding N-(1-naphthyl) - 2,2,2 - trifluoroacetamide (II) where R is a phenyl, cyclohexyl, furyl or thienyl radical or a $C_1$ to $C_{17}$ hydrocarbon radical, R being optionally substituted by lower alkyl, lower alkoxy, halo, nitro, phenyl or phenoxy. The products are pharmacologically active. In particular, they have antiparasitic properties and are useful schistosomacides.

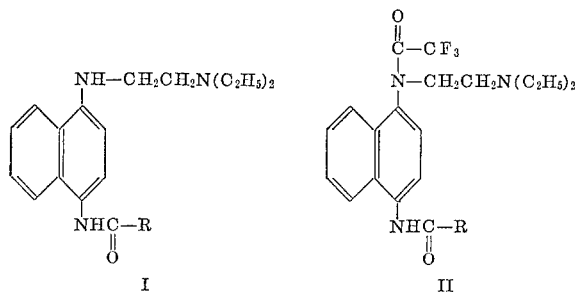

SUMMARY AND DETAILED DESCRIPTION

The present invention relates to novel aminonaphthylamide compounds that are useful as pharmacological agents and to means for their production. More particularly, the invention relates to aminonaphthylamide compounds having in free base form the formula

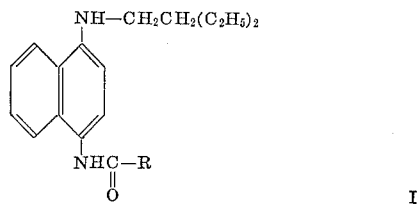

where R is a furyl or thienyl radical or a $C_1$ to $C_{17}$ hydrocarbon radical, R being optionally substituted by lower alkyl or alkoxy (preferably methyl or methoxy), halo, nitro, phenyl or phenoxy.

In accordance with the invention the compounds are produced by subjecting the corresponding N-(1-naphthyl)-2,2,2-trifluoroacetamide of formula

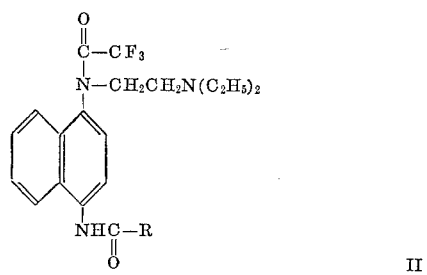

to alkaline hydrolysis; where R has the same significance. For the reaction, the trifluoroacetamide starting material can be used either in free base form or as the acid addition salt in which latter form the salt is converted in situ to the free base. The reaction conditions may be varied widely and are not critical. In general, the reaction is carried out at temperatures in the range from about 20–175° C. for periods of one to twenty-four hours. The reaction is preferably carried out at 65–85° C. and is usually complete in this range within one to six hours. As a hydrolytic agent for the reaction, one can use any of various bases or mixtures such as alkali metal and alkaline earth metal hydroxides, alkali metal carbonates and alkoxides, trialkyl-ammonium hydroxides and the like. Alkali metal hydroxides such as sodium or potassium hydroxide are preferred, conveniently in aqueous solution. Although equivalent amounts of reactants may be used, the hydrolytic agent is preferably used in at least a slight excess required for hydrolysis. The hydrolysis is carried out in water or aqueous solvent such as an aqueous solution of unreactive, water miscible, organic solvent (for example, an aliphatic alcohol, dioxane, tetrahydrofuran, ethylene glycol or a lower alkyl ether of ethylene or diethylene glycol). Aqueous ethanol is a preferred solvent.

The free base compounds of the invention form acid addition salts upon reaction with organic and inorganic acids. Some examples of the acid addition salts of the invention are the inorganic acid salts such as the hydrochloride, hydrobromide, hydroiodide, sulfate and phosphate and organic acid salts such as the carbonate, succinate, benzoate, acetate, citrate, maleate, maleate, p-toluenesulfonate, gluconate, benzenesulfonate and sulfamate, as well as salts with dibasic acids such as methylenebis(hydroxynaphthoic acid). The acid addition salts are conveniently formed by mixing the free base with at least an equivalent amount of the acid in a solvent in which the salt is poorly soluble, particularly after chilling, thereby permitting recovery of the desired salt as a solid phase. The invention contemplates the acid salts broadly. In general, the choice of anion is not critical since the cation constitutes the active moiety. The selection and provision of salts for the purposes of the invention will be understood by those skilled in the art in accordance with general methods and considerations which per se will be known to them. Those salts which are unsuited to particular uses, as for example uses where toxicity is a problem, are nevertheless useful as intermediates, being readily convertible to nontoxic acid salts by means which per se are known to those in the art. Whereas both the free base and salt forms of the products are useful for the purposes of the invention, the salts, especially with inorganic acids, are generally preferred in those cases where increased water solubility is desired.

The compounds of the invention are useful as chemotherapeutic agents, especially as antiparasitic agents and particularly as schistosomacides. Their antiparasitic activity can be demonstrated and quantitatively measured in standard tests against the schistosome species Schistosoma mansoni.

In the test used to determine schistosomacidal activity, female Stout mice weighing 13–15 grams each are infected intraperitoneally with 75 S. mansoni (Puerto Rican strain) cercariae (from the snail host Australorbis glabratus) six weeks prior to treatment. The experimental groups usually consist of 5 to 10 mice, while the sham-dosed control groups number 10 to 15 mice per experiment. All of the mice are fed Rockland mouse food from the time of infection to autopsy. The test compounds are administered in the diet or by gavage. Following treatment for a measured period, the animals are killed and autopsied and the activity of the test compound is evaluated primarily on the basis of the distribution and number of living and dead worms in the liver, portal veins, and mesenteric veins. This activity is then expressed in terms of the percentage of schistosomes found killed after the period of treatment at a given dosage level, which is expressed either as a percentage of the diet or in mg./kg./day when administration is by gavage. The activities of compounds of the invention, as determined by this test procedure, are shown in the table that follows.

The compounds in the table are identified by reference to the examples that follow, where the preparation of each is described.

SCHISTOSOMACIDAL ACTIVITY

| Compound | Percent schistosomes dead at— | |
|---|---|---|
| | Percent mouse diet for No. days | Mg./kg. gavage dose for No. days (mouse) |
| Example: | | |
| 1 | 94/0.25%/14 | |
| 2 | 100/0.0625%/14 | |
| 4 | 100/0.0625%/14 | |
| 5 | 100/0.0625%/14 | |
| 6 | | 74/100/5. |
| 7 | 60/0.25%/14 | |
| 8 | 87/0.0625%/14 | |
| 9 | | 88/100/5. |
| 10 | 100/0.0625%/14 | 95/100/5. |
| 11 | 91/0.125%/14 (HCl salt) | |
| 12 | 97/0.0625%/14 | |
| 13 | 71/0.0625%/14 | |
| 14 | 96/0.125%/7 plus 0.0625%/7 | |
| 15 | | 78/100/5. |
| 16 | 90/0.25%/7 plus 0.0625%/7 | |
| 17 | 100/0.0625%/14 | |
| 18 | 100/0.125%/14 | |
| 19 | 89/0.125%/7 plus 0.0625%/7 | |
| 20 | 67/0.125%/7 plus 0.0313%/7 | |
| 21 | 67/0.0625%/14 | |
| 22 | | 77/50/5. |
| 23 | | 41/200/5. |
| 24 | 100/0.25%/14 | |
| 25 | | 44/200/5. |
| 26 | 95/0.25%/14 | |
| 27 | | 62/100/2 plus 50/3. |
| 28 | | 100/100/5. |
| 29 | 77/0.0625%/14 | |
| 30 | 63/0.05625%/14 | |
| 31 | | 86/200/5. |
| 32 | | 61/100/5. |
| 33 | 90/0.125%/7 plus 0.0625%/7 | |

The invention is illustrated by the following examples.

Example 1

A mixture of 50 g. of N-(4-amino-1-naphthyl)-N-(2-diethylaminoethyl)-2,2,2 - trifluoroacetamide monohydrochloride, 50 ml. acetic anhydride, and 200 ml. glacial acetic acid is refluxed two hours and then concentrated in vacuo. A solution of the residue in ethanol is alkalinized with aqueous sodium hydroxide. The product, N-(4-acetamido-1-naphthyl)-N-(2 - diethylaminoethyl) - 2,2,2 - trifluoroacetamide, is not isolated. It is used in situ as a starting material for the hydrolysis. To accomplish the hydrolysis, the ethanol mixture is held under reflux for four hours. The reaction mixture is first concentrated and then triturated with dilute sodium hydroxide to yield the desired free base product, N-[4-{[2-(diethylamino)ethyl]amino}-1-naphthyl]acetamide, M.P. 96–98° after recrystallization from ethyl acetate.

To obtain the hydrochloride salt, an ether solution of the product is treated with excess ethanolic hydrogen chloride. The supernatant layer is decanted and the residue triturated with ether to yield the dihydrochloride, D.P. 151–161°.

Example 2

A mixture of 10 g. of N-(4-amino-1-naphthyl)-N-(2-diethylaminoethyl)-2,2,2-trifluoroacetamide monohydrochloride, 3.4 g. of propionic anhydride, and 75 ml. of pyridine is refluxed three hours and then concentrated in vacuo. A solution of the residue in ethanol alkalinized with aqueous sodium hydroxide and containing N-(4-propionamido-1-naphthyl)-N-(2-diethylaminoethyl - 2,2,2-trifluoroacetamide is refluxed three hours. The residue obtained on concentration of this mixture is triturated with water, chilled, and then filtered. The product thus obtained is N-[4-{[2-(diethylamino) - ethyl]amino} - 1 - naphthyl]propionamide, M.P. 96.5–99° after recrystallization from benzene-petroleum ether.

Example 3

A mixture of 1.0 g. of N-(4-amino-1-naphthyl)-N-(2-diethylaminoethyl)-2,2,2-trifluoroacetamide monohydrochloride, 2.75 g. of butyryl chloride, and 75 ml. of pyridine is refluxed three hours and then concentrated in vacuo. A solution of the residue in ethanol is treated with 50 ml. of 30% sodium hydroxide and the resulting mixture containing N-(4-butyramido-1-naphthyl)-N-(2 - diethylaminoethyl) - 2,2,2 - trifluoroacetamide is refluxed three hours. The residue obtained upon concentration of the reaction mixture is triturated with water and then filtered to yield the product N - [4-{[2 - (diethylamino) ethyl]amino} - 1 - naphthyl]butyramide, M.P. 104–105° after recrystallization from aqueous ethanol.

To obtain the salicylate salt, an ethanol solution of a portion of the product is treated with ethanolic salicylic acid and the salicylate collected, M.P. 116–119° after trituration with ether. To obtain the hydrochloride, an ethanolic solution of another portion of the product is saturated with anhydrous hydrogen chloride. Trituration of the precipitate with ether yields the sesquihydrochloride hydrate, M.P. 145–149°.

Example 4

Proceeding as in Example 2 but substituting 4.5 g. of isobutyric anhydride for 3.4 g. of propionic anhydride, and hydrolyzing N-(4-isobutyramido-1-naphthyl)-N-(2-diethylaminoethyl) - 2,2,2 - trifluoroacetamide produced, the product obtained is N-[4-{[2-(diethylamino)ethyl]amino}-1-naphthyl] - 2 - methylpropionamide, M.P. 110–112.5° after recrystallization from n-heptane.

Treatment of an ethanol solution of a portion of the product with ethanolic oxalic acid yields the oxalate hydrate, M.P. 100–105° after trituration with ether.

Example 5

Substituting 4.5 g. of valeric anhydride for 3.4 g. of propionic anhydride in Example 2, and hydrolyzing the N - (4 - valeramido - 1 - naphthyl) - N - (2 - diethylaminoethyl)-2,2,2-trifluoroacetamide produced, the product obtained is N-[4-{[2-(diethylamino)ethyl]amino}-1-naphthyl]valeramide, M.P. 100–103° after recrystallization from n-heptane.

Example 6

Substituting 3.1 g. of 2-methylbutyryl chloride for 2.7 g. of butyryl chloride in Example 3, and hydrolyzing the N-[4 - (2 - methylbutyramido) - 1 - naphthyl] - N - (2-diethylaminoethyl)-2,2,2-trifluoroacetamide produced, the product obtained is N - [4 - {[2 - diethylamino)ethyl]amino}-1-naphthyl]-2-methylbutyramide, M.P. 106–108° after recrystallization from isopropyl ether.

Example 7

Substituting 3.1 g. of trimethylacetyl chloride for 2.7 g. of butyryl chloride in Example 3, and hydrolyzing the N - (4 - trimethylacetamido - 1 naphthyl) - N - (2 - diethylaminoethyl) - 2,2,2 - trifluoroacetamide produced, the product obtained is N-[{4-[2-(diethylamino)ethyl]amino}-1-naphthyl] - 2,2 - dimethylpropionamide, M.P. 113.5–115.5° after recrystallization from n-heptane.

Example 8

Substituting 5.5 g. of hexanoic anhydride for 3.4 g. of propionic anhydride in Example 2, and hydrolyzing the N-(4-hexanamido-1-naphthyl)-N - (2-diethylaminoethyl)-2,2,2-trifluoroacetamide produced, the product obtained is N-[4-{[2-diethylamino)ethyl]amino} - 1 - naphthyl]hexanamide, M.P. 101–103.5° after recrystallization from n-heptane.

An ether solution of a portion of the product is treated with ethanolic hydrogen chloride. The separated product is triturated with ethyl acetate to yield a dihydrochloride hydrate, M.P. 115–117°.

Another portion of the product in ethanol is treated with ethanolic citric acid to yield the citrate, M.P. 74–76° after trituration with ether.

Example 9

Substituting 3.5 g. of 4-methylvaleryl chloride for 2.7 g. of butyryl chloride in Example 3, and hydrolyzing the N-[4-(4-methylvaleramido) - 1 - naphthyl]-N-(2-diethylaminoethyl)-2,2,2-trifluoroacetamide produced, the product obtained is N-[4-{[2-(diethylamino)ethyl]amino}-1-naphthyl]-4-methylvaleramide, M.P. 100–101° after recrystallization from n-heptane.

Example 10

Substituting 6.5 g. of heptanoic anhydride for 3.4 g. of propionic anhydride in Example 2, and hydrolyzing the N - 4-heptanamido-1-naphthyl)-N-(2-diethylaminoethyl)-2,2,2-trifluoroacetamide produced, the product obtained is N-[4-{[2-(diethylamino)ethyl]amino} - 1 - naphthyl]heptanamide, M.P. 95–98° after recrystallization from n-heptane.

Example 11

Substituting 3.7 g. of benzoyl chloride for 2.7 g. of butyryl chloride in Example 3, and hydrolyzing the N-(4-benzamido - 1 - naphthyl)-N-(2-diethylaminoethyl)-2,2,2-trifluoroacetamide produced, the product obtained is N-[4-{[2-(diethylamino)ethyl]amino} - 1 - naphthyl]benzamide, M.P. 134–135.5° after recrystallization from aqueous ethanol.

A soution of the above amide in isopropanol-ether is saturated with anhydrous hydrogen chloride. After recrystallization from ethanol, the precipitated monohydrochloride melts at 230–231.5°.

Example 12

Substituting 6.1 g. of cyclohexanecarboxylic anhydride for 3.4 g. of propionic anhydride in Example 2, and hydrolyzing the N - (4-cyclohexanecarboxamido-1-naphthyl)-N-(2-diethylaminoethyl) - 2,2,2 - trifluoroacetamide produced, the product obtained is N-[4-{[2-(diethylamino)ethyl]amino} - 1 - naphthyl]cyclohexanecarboxamide, M.P. 119–120.5° after recrystallization from acetonitrile.

An ehanol solution of a portion of the above solid is treated with ethanolic tartaric acid to yield a hydrated tartrate, M.P. 105–110° after trituration with ether.

Example 13

Substituting 4.2 g. of octanoyl chloride for 2.7 g. of butyryl chloride in Example 3, and hydrolyzing the N-(4-octanamido-1-naphthyl) - N - (2 - diethylaminoethyl)-2,2,2-trifluoroacetamide produced, the product obtained is N-[4-{[2-(diethylamino)ethyl]amino} - 1 - naphthyl]octanamide, M.P. 98–100° after recrystallization from dilute ethanol.

Example 14

Substituting 4.0 g. of p-toluoyl chloride for 2.7 g. of butyryl chloride in Example 3, and hydrolyzing the N-(4-p-toluamido - 1 - naphthyl-N-(2-diethylaminoethyl)-2,2,2-trifluoroacetamide produced, the product obtained is N-[4-{[2-(diethylamino)ethyl]amino} - 1 - naphthyl]-p-toluamide, ⅓ formula weight of benzene of crystallization, M.P. 143–145° after recrystallization from benzene.

Example 15

Substituting 4.6 g. of nonanoyl chloride for 2.7 g. of butyryl chloride in Example 3, and hydrolyzing the N-(4-nonanamido-1-naphthyl) - N - (2 - diethylaminoethyl)-2,2,2-trifluoroacetamide produced, the product obtained is N-[4-{[2-(diethyl-amino)ethyl]amino} - 1 - naphthyl]nonanamide, M.P. 59–62° after recrystallization from n-heptane.

Example 16

Substituting 4.4 g. of hydrocinnamoyl chloride for 2.7 g. of butyryl chloride in Example 3, and hydrolyzing the N - (4-hydrocinnamido - 1 - naphthyl)-N-(2-diethylaminoethyl)-2,2,2-trifluoroacetamide produced, the product obtained is N-[4-{[2-(diethylamino)ethyl]amino}-1-naphthyl]hydrocinnamamide, M.P. 87–90° after recrystallization from isopropyl ether.

Example 17

Substituting 4.3 g. of cinnamoyl chloride for 2.7 g. of butyryl chloride in Example 3, and hydrolyzing the N-(4-cinnamamido - 1 - naphthyl)-N-(2-diethylaminoethyl)-2,2,2-trifluoroacetamide produced, the product obtained is N-[4-{[2-(diethylamino)ethyl]amino} - 1 - naphthyl]cinnamamide, M.P. 149.5–151.5° after recrystallization from ethyl acetate.

Example 18

Substituting 12.6 g. of decanoic anhydride for 3.4 g. of propionic anhydride in Example 2, and hydrolyzing the N - (4-decanamido - 1 - naphthyl)-N-(2-diethylaminoethyl)-2,2,2-trifluoroacetamide produced, the product obtained is N-[4-{[2-(diethylamino)ethyl]amino} - 1 - naphthyl]decanamide, M.P. 57–61° after recrystallization from n-heptane.

Example 19

Substituting 5.3 g. of undecanoyl chloride for 2.7 g. of butyryl chloride in Example 3, and hydrolyzing the N-(4-undecanamido-1-naphthyl) - N - (2 - diethylaminoethyl)-2,2,2-trifluoroacetamide produced, the product obtained is N-[4-{[2-(diethylamino)ethyl]amino} - 1 - naphthyl]undecanamide, M.P. 52–54° after recrystallization from n-heptane.

Example 20

Substituting 5.2 g. of undecenoyl chloride for 2.7 g. of butyryl chloride in Example 3, and hydrolyzing the N-[4-(10-undecenamido) - 1 - naphthyl]-N-(2-diethylaminoethyl)-2,2,2-trifluoroacetamide produced, the product obtained is N-[4-{[2-diethylamino)ethyl]amino} - 1 - naphthyl]-10-undecenamide, M.P. 48–51° after recrystallization from isopropyl ether.

Example 21

Substituting 9.8 g. of lauric anhydride for 3.4 g. of propionic anhydride in Example 2, and hydrolyzing the N-(4-dodecanamido-1-naphthyl) - N - (2 - diethylaminoethyl)-2,2,2-trifluoroacetamide produced, the product obtained is N-[4-{[2-(diethylamino)ethyl]amino} - 1 - naphthyl]dodecanamide, M.P. 52–54° after recrystallization from n-heptane.

Treatment of an ethanolic solution of a portion of the product with an aqueous solution of naphthylene-1,5-disulfonic acid yields hydrated hemi-naphthylene-1,5-disulfonate, M.P. 173–175°.

Example 22

Substituting 6.0 g. of tridecanoyl chloride for 2.7 g. of butyryl chloride in Example 3, and hydrolyzing the N-(4-tridecanamido-1-naphthyl) - N - (2 - diethylaminoethyl-2,2,2-trifluoroacetamide produced, the product obtained is N-[4-{[2-(diethylamino)ethyl]amino} - 1 - naphthyl]tridecanamide, M.P. 55–57.5° after recrystallization from n-heptane.

Example 23

Substituting 6.7 g. of pentadecanoyl chloride for 2.7 g. of butyryl chloride in Example 3, and hydrolyzing the N-(4-pentadecanamido - 1 - naphthyl)-N-(2-diethylaminoethyl)-2,2,2-trifluoroacetamide produced, the product obtained is N-[4-{[2-(diethylamino)ethyl]amino} - 1 - naphthyl]pentadecanamide, M.P. 74–77° after recrystallization from n-heptane.

Example 24

Substituting 12.7 g. of palmitic anhydride for 3.4 g. of propionic anhydride in Example 2, and hydrolyzing the N-(4-hexadecanamido-1-naphthyl)-N-(2 - diethylaminoethyl)-2,2,2-trifluoroacetamide produced, the product obtained is N-[4 - {[2-(diethylamino)ethyl]amino}-1-naphthyl]hexadecanamide, M.P. 70–72° after recrystallization from n-heptane.

Example 25

Substituting 7.4 g. of n-heptadecanoyl chloride for 2.7 g. of butyryl chloride in Example 3, and hydrolyzing the N-(4 - heptadecanamido-1-naphthyl)-N-(2-diethylaminoethyl)-2,2,2-trifluoroacetamide produced, the product obtained is N-[4-{2-(diethylamino)ethyl]amino}-1-amino}-1-naphthyl]heptadecanamide, M.P. 80–81° after recrystallation from n-heptane.

Example 26

Substituting 14.2 g. of stearic anhydride for 3.4 g. of propionic anhydride in Example 2, and hydrolyzing the N-(4-octadecanamido - 1 - naphthyl)-N-(2-diethylaminoethyl)-2,2,2-trifluoroacetamide produced, the product obtained is N-[4 - {[2-(diethylamino)ethyl]amino}-1-naphthyl]octadecanamide, M.P. 77.5–79.5° after recrystallization from n-heptane.

Example 27

Substituting 2.8 g. of methoxyacetyl chloride for 2.7 g. of butyryl chloride in Example 3, and hydrolyzing the N-[4-(2-methoxyacetamido) - 1 - naphthyl]-N-(2-diethylaminoethyl)-2,2,2-trifluoroacetamide produced, the product obtained is N-[4-{[2-(diethylamino)ethyl[amino}-1-naphthyl]-2-methoxyacetamide, M.P. 84.5–85.5° after recrystallization from n-heptane.

Example 28

Substituting 4.6 g. of phenoxyacetyl chloride for 2.7 g. of butyryl chloride in Example 3, and hydrolyzing the N-[4-(2-phenoxyacetamido) - 1 - naphthyl]-N-(2-diethylaminoethyl)-2,2,2-trifluoroacetamide produced, the product obtained is N-[4-{[2-(diethylamino)ethyl]amino}-1-naphthyl]-2-phenoxyacetamide, M.P. 111–113° after recrystallization from aqueous ethanol.

Example 29

Substituting 4.5 g. of p-chlorobenzoyl chloride for 2.7 g. of butyryl chloride in Example 3, and hydrolyzing the N-[4-(p-chlorobenzamido) - 1 - naphthyl]-N-(2-diethylaminoethyl)-2,2,2-trifluoroacetamide produced, the product obtained is p-chloro-N-[4 - {[2-diethylamino)ethyl]amino}-1-naphthyl]benzamide, M.P. 177–180° after recrystallization from ethanol and then from acetonitrile.

Example 30

Substituting 5.7 g. of p-bromobenzoyl chloride for 2.7 g. of butyryl chloride in Example 3, and hydrolyzing the N-[4-(p-bromobenzamido) - 1 - naphthyl]-N-(2-diethylaminoethyl)-2,2,2-trifluoroacetamide produced, the product obtained is p-bromo-N-[4-{[2-(diethylamino)ethyl]amino}-1-naphthyl]benzamide, M.P. 192–194° after recrystallization from acetonitrile.

Example 31

Substituting 6.8 g. of m-bromobenzoyl bromide for 2.7 g. of butyryl chloride in Example 3, and hydrolyzing the N-[4-(m-bromobenzamido) - 1 - naphthyl]-N-(2-diethylaminoethyl)-2,2,2-trifluoroacetamide produced, the product obtained is m-bromo-N-[4-{[2-(diethylamino)ethyl]amino}-1-naphthyl]benzamide, M.P. 128–130° after recrystallization from isopropyl ether.

Example 32

Substituting 5.0 g. of p-nitrobenzoyl chloride for 2.7 g. of butyryl chloride in Example 3, and hydrolyzing the N-(4-p-nitrobenzamido - 1 - naphthyl)-N-(2 - diethylaminoethyl)-2,2,2-trifluoroacetamide produced, the product obtained is N-[4-{[2-(diethylamino)ethyl]amino)-1-naphthyl]-p-nitrobenzamide, M.P. 227–229° after recrystallization from benzene.

Treatment of a portion of the product (dissolved in ethanol-ether) with ethanolic salicylic acid yields the salicylate, M.P. 161–164°.

Example 33

Substituting 3.4 g. of furoyl chloride for 2.7 g. of butyryl chloride in Example 3, and hydrolyzing the N-[4-(2-furamido)-1-naphthyl] - N - (2-diethylaminoethyl)-2,2,2-trifluoroacetamide produced, the product obtained is N-[4-{[2 - (diethylamino)ethyl]amino}-1-naphthyl]-2-furamide, M.P. 115–117.5° after recrystallization from isopropyl ether.

An ethanol solution of a portion of the product treated with ethanolic citric acid yields the citrate, M.P. 85–87° after trituration with ether.

Example 34

Substituting 3.8 g. of 2-thienyl chloride for 2.7 g. of butyryl chloride in Example 3, and hydrolyzing the N-[4-(2-thiophenecarboxamido-1-naphthyl] - 1 - naphthyl]-N-(2-diethylaminoethyl)-2,2,2-trifluoroacetamide produced, the product obtained is N-[4 - {[2 - (diethylamino)ethyl]amino}-1-naphthyl]-2-thiophenecarboxamide, M.P. 162–164.5° after recrystallization from isopropanol.

I claim:
1. An aminonaphthylamide compound selected from the group consisting of a free base of formula

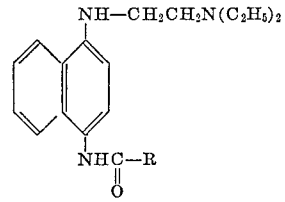

and acid addition salts of the free base where R is a furyl or thienyl radical, a $C_1$ to $C_{17}$ alkyl radical or decenyl radical, or a phenyl, halophenyl, nitrophenyl, methylphenyl, methoxyphenyl, phenoxymethyl, phenethyl, styryl, or cyclohexyl group.

2. The compound according to claim 1 which compound in free base form is N - [4 - {[2-(diethylamino)ethyl]amino}-1-naphthyl]heptanamide.

3. Process for the production of aminonaphthylamide compounds as defined in claim 1 which comprises subjecting the corresponding N-(1-naphthyl)-2,2,2-trifluoroacetamide of formula

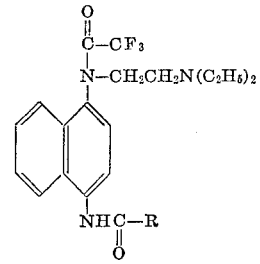

II to aqueous alkaline hydrolysis; where R is as defined in claim 1.

4. Process according to claim 4 wherein a hydrolysis is carried out at 65–85° C. using aqueous alkali metal hydroxide as a hydrolytic agent.

(References on following page)

References Cited

UNITED STATES PATENTS 3,467,710  9/1969  Kaltenbronx _____ 260—562

HENRY R. JILES, Primary Examiner
H. I. MUOTZ, Assistant Examiner

U.S. Cl. X.R.

260—557(R), 558(D), 558(P), 559(R), 559(P), 332.2 (C), 347.3, 404.5; 424—275, 283, 324